(12) United States Patent
Pappert (10) Patent No.: US 12,387,589 B2
(45) Date of Patent: Aug. 12, 2025

(54) BATTERY ENHANCING VEHICLE INTERNAL TEMPERATURE MONITORING DEVICE

(71) Applicant: Bernard Pappert, Austin, TX (US)

(72) Inventor: Bernard Pappert, Austin, TX (US)

( * ) Notice: Subject to any disclaimer, the term of this patent is extended or adjusted under 35 U.S.C. 154(b) by 108 days.

(21) Appl. No.: 18/370,153

(22) Filed: Sep. 19, 2023

(65) Prior Publication Data

US 2025/0095474 A1    Mar. 20, 2025

(51) Int. Cl.
| | |
|---|---|
| *G08B 21/18* | (2006.01) |
| *B60N 2/26* | (2006.01) |
| *G01K 1/024* | (2021.01) |
| *G01K 1/08* | (2021.01) |
| *G01K 1/14* | (2021.01) |
| *G01K 3/00* | (2006.01) |
| *G08B 21/02* | (2006.01) |
| *H02J 7/00* | (2006.01) |

(52) U.S. Cl.
CPC .......... *G08B 21/182* (2013.01); *B60N 2/274* (2023.08); *G01K 1/024* (2013.01); *G01K 1/08* (2013.01); *G01K 1/14* (2013.01); *G01K 3/005* (2013.01); *G08B 21/02* (2013.01); *H02J 7/0042* (2013.01)

(58) Field of Classification Search
CPC ...... G08B 21/182; G08B 21/02; B60N 2/274; G01K 1/024; G01K 1/08; G01K 1/14; G01K 3/005; H02J 7/0042
USPC ........................................................ 340/584
See application file for complete search history.

(56) References Cited

U.S. PATENT DOCUMENTS

| | | | |
|---|---|---|---|
| D668,164 S | 10/2012 | Cowles | |
| 9,701,243 B1 * | 7/2017 | Phatak | ..................... B60Q 9/00 |
| 9,770,962 B2 | 9/2017 | Quave | |
| 9,845,050 B1 * | 12/2017 | Garza | ................ G08B 21/0205 |
| 10,239,448 B1 | 3/2019 | Samuel, Jr. | |
| 10,369,927 B2 | 8/2019 | Crawford | |
| 2007/0211076 A1 * | 9/2007 | Kates | ..................... G08B 21/20 |
| | | | 345/605 |
| 2013/0201013 A1 | 8/2013 | Schoenberg | |
| 2017/0148294 A1 * | 5/2017 | Eswaran | ................... B60Q 9/00 |
| 2017/0182939 A1 * | 6/2017 | Phatak | ..................... B60Q 9/00 |
| 2018/0068544 A1 * | 3/2018 | Caperell | ............... H04W 4/027 |
| 2019/0027011 A1 | 1/2019 | Gordon | |

(Continued)

FOREIGN PATENT DOCUMENTS

WO    WO2018089855    5/2018

*Primary Examiner* — Zhen Y Wu (57) ABSTRACT

A system for monitoring ambient temperatures surrounding a child's car seat and alerting a user of unsafe highs or lows includes a battery and a microcontroller mounted within a housing. The microcontroller includes a transmitter that communicates with a temperature sensor and an external server. The transmitter and the temperature sensor each have an active state and a resting state. In the resting state, the components draw little to no power from the battery. The temperature sensor periodically enters the active state to take ambient temperature readings. When those ambient temperature readings fall outside of the predetermined ranges for child safety, the transmitter enters the active state and sends an alert to the server, which relays the alert to the user. The transmitter can also send the alert to an emergency communications line or emit an audible alarm to alert nearby people of the unsafe conditions.

19 Claims, 5 Drawing Sheets

(56) References Cited

U.S. PATENT DOCUMENTS

| | | |
|---|---|---|
| 2019/0152345 A1 | 5/2019 | Oranges |
| 2019/0272729 A1* | 9/2019 | Staninger ............... G08B 21/22 |
| 2020/0322700 A1* | 10/2020 | Matlin ................. G08B 21/182 |
| 2022/0068114 A1* | 3/2022 | Baldwin .................. B60Q 1/52 |
| 2023/0060936 A1* | 3/2023 | Thiruvenkatanathan .................... G10L 25/21 |
| 2023/0196899 A1* | 6/2023 | Yilmaz .................. G01S 13/04 340/573.1 |

* cited by examiner

BATTERY ENHANCING VEHICLE INTERNAL TEMPERATURE MONITORING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to temperature monitors and more particularly pertains to a new temperature monitor for measuring an ambient temperature and alerting a user of unsafe highs or lows.

(2) Description of Related Art Including Information Disclosed Under 37 CFR 1.97 and 1.98

The prior art relates to temperature monitors. Some temperature monitors use a pressure pad to determine if a child or other person is inside a vehicle. However, these monitors are expensive and can be difficult to retrofit into used vehicles. Some newer car models also issue an audible reminder alert if, at the beginning of a drive, a rear car door is opened and, at the end of the drive, the rear car door is not opened. These audible reminders are intended to help the driver remember to check the back seat to ensure children or other passengers have exited the vehicle at the end of the drive. However, these audible reminders are unavailable in older cars. Other prior art references disclose temperature sensors that are powered on when a child is buckled into their car seat. These sensors may issue an alert when the surrounding temperatures become unsafe for the child. However, these sensors only work on newer seats which have the sensors integrally installed within the car seats. Thus, there is a need in the art for an affordable temperature monitoring system that can be used in old or new car seats and in any vehicle.

BRIEF SUMMARY OF THE INVENTION

An embodiment of the disclosure meets the needs presented above by generally comprising a temperature monitoring device that can be affixed to a child's car seat. The temperature monitoring device has a housing. A power source and a microcontroller are mounted within the housing. The microcontroller includes a transmitter that wirelessly communicates with an external server and a temperature sensor within the housing. The transmitter and the temperature sensor each have an active state and a resting state. In the resting state, the transmitter and temperature sensor draw little to no power from the power source. The temperature sensor is programmed to periodically enter the active state to take ambient temperature readings. When those ambient temperature readings fall outside of the predetermined ranges for child safety, the transmitter enters the active state and sends an alert to the server, which relays the alert to the user's mobile device. If the user fails to respond to the alert, the transmitter sends the alert to an emergency communications line. If the server is unresponsive, the transmitter emits an audible alarm at a level that will alert passersby without risking damage to the child's hearing. Future minimization of the hardware modules, including the power source, the microcontroller, and the temperature sensor, will make it feasible to connect the temperature monitoring device to a pet's collar to provide protection from excessive heat.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
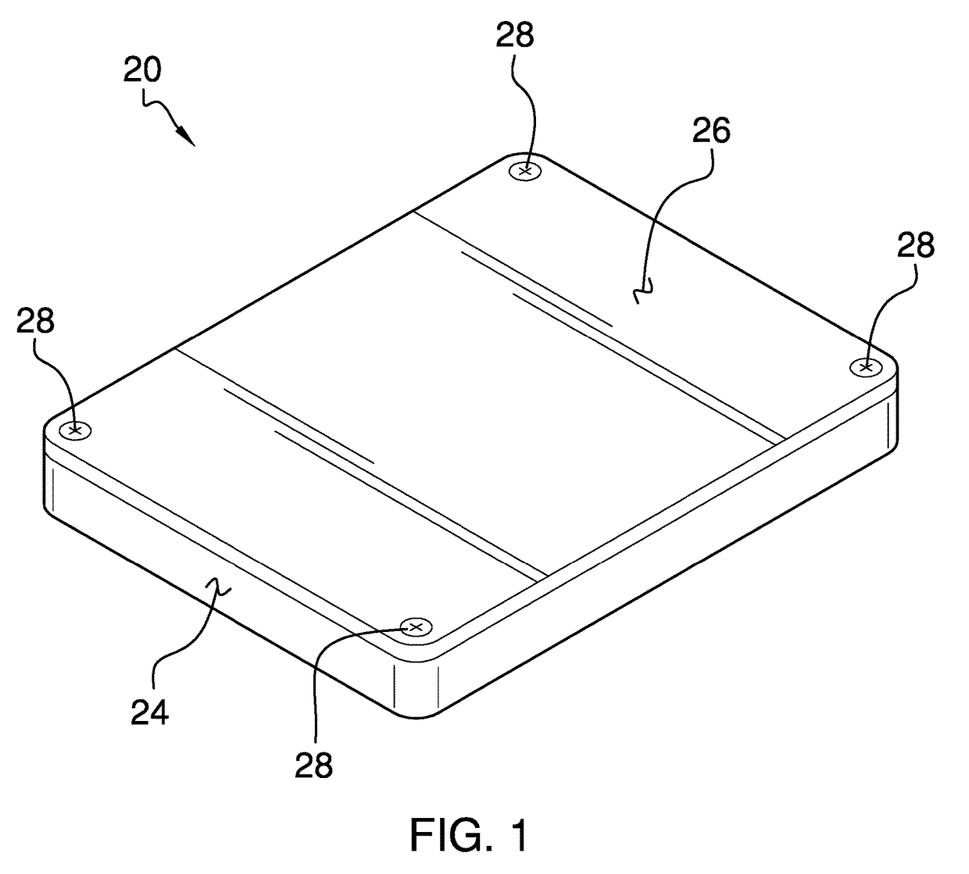
FIG. 1 is an isometric view of a system and device for monitoring ambient temperatures according to an embodiment of the disclosure.
Figure 2:
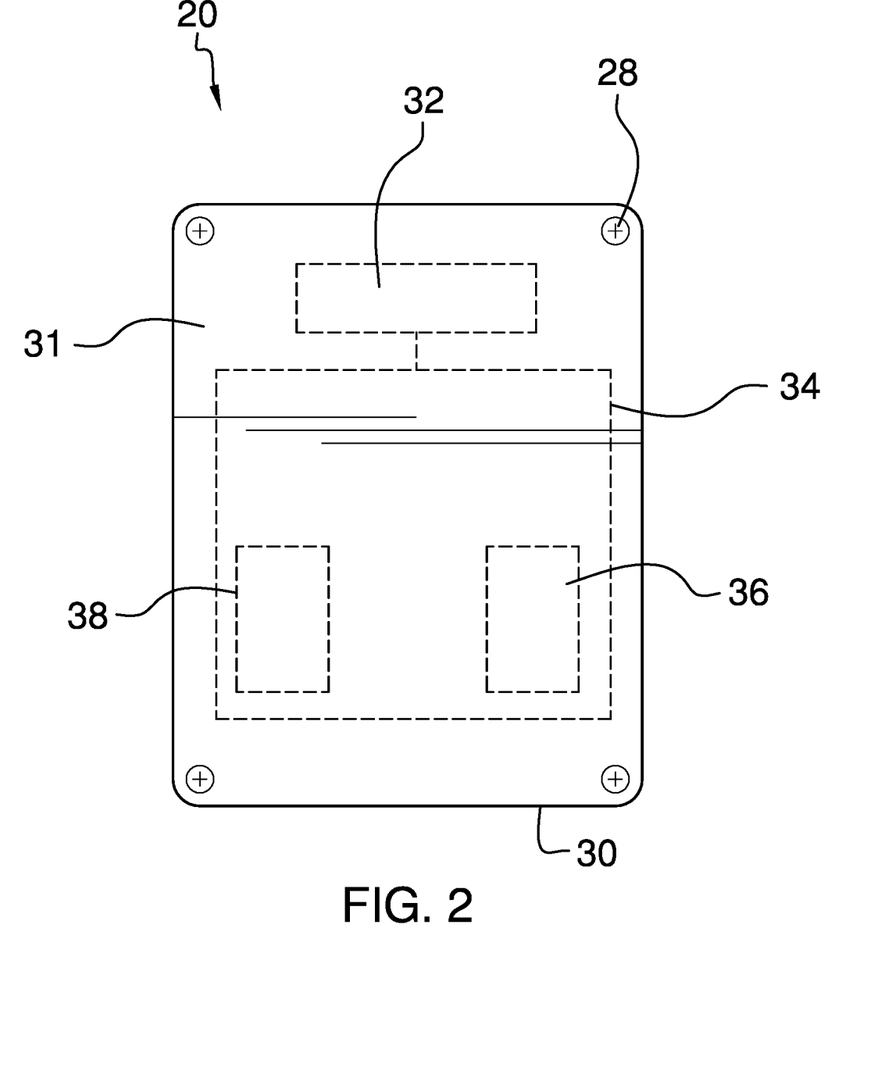
FIG. 2 is a front view of an embodiment of the disclosure.
Figure 3:
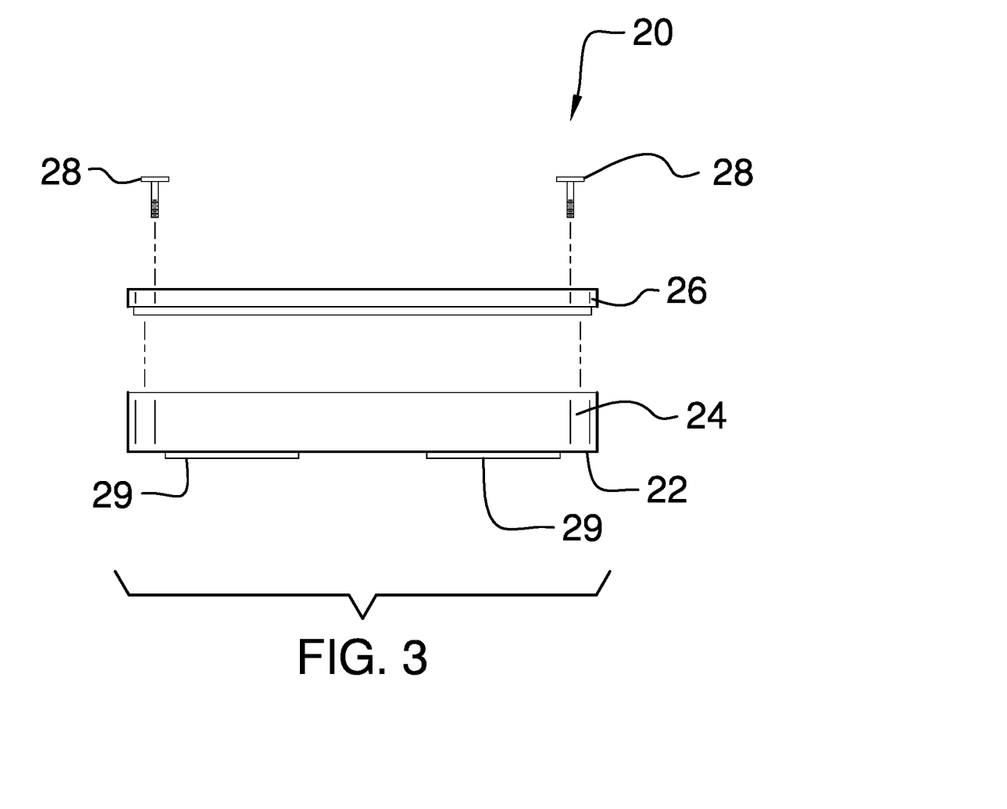
FIG. 3 is an exploded view of an embodiment of the disclosure.
Figure 4:
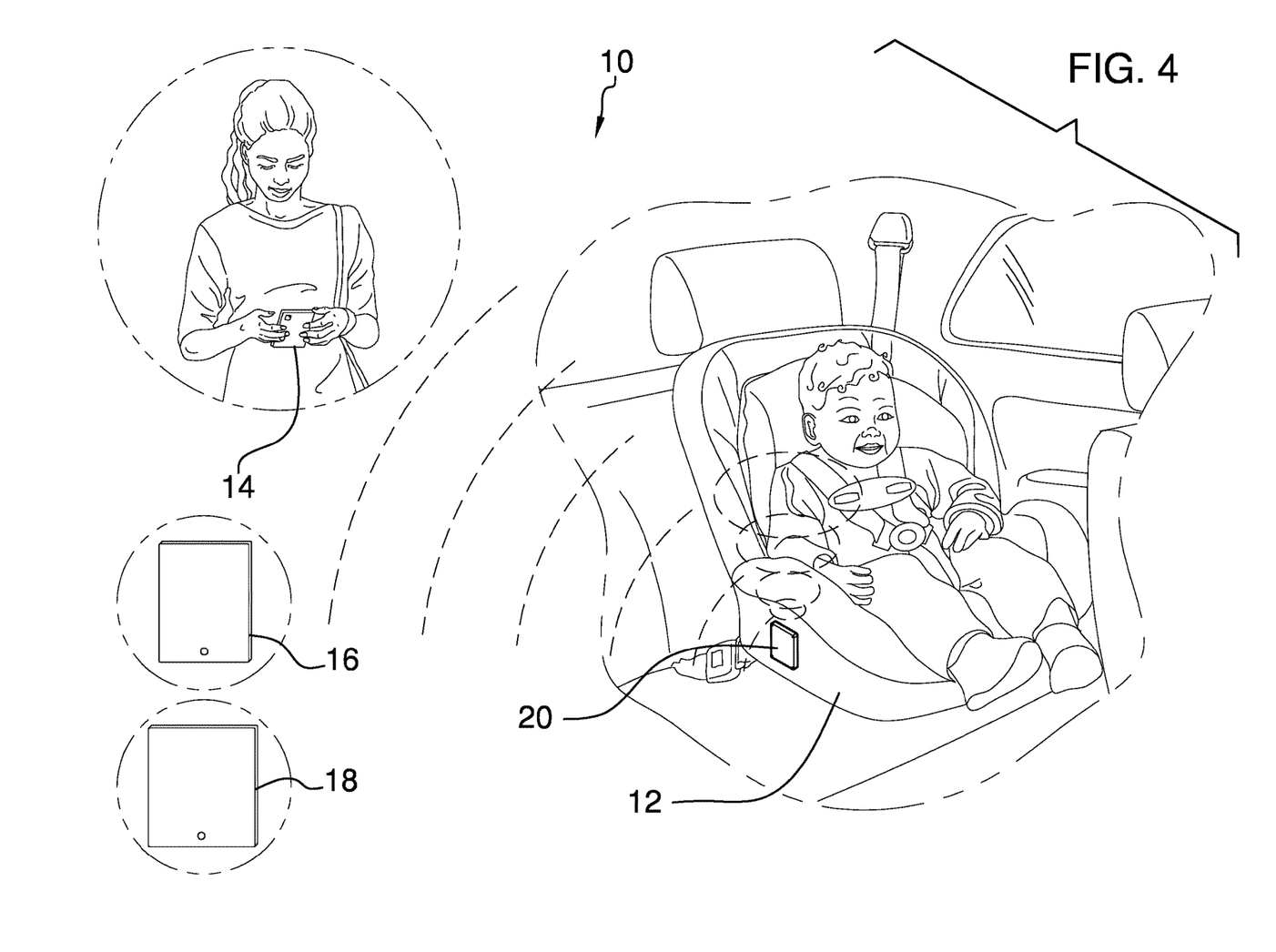
FIG. 4 is an in-use view of an embodiment of the disclosure.
Figure 5:
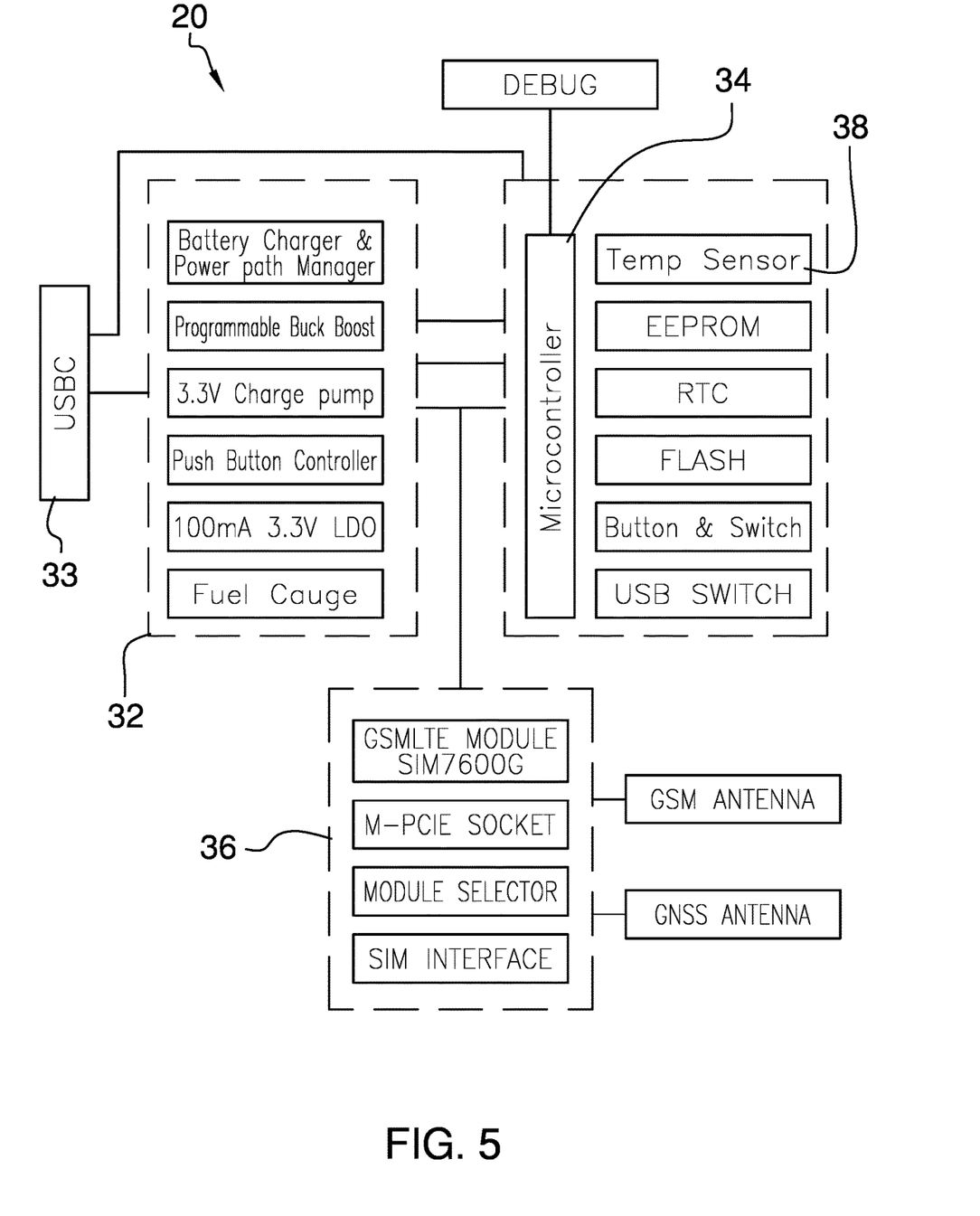
FIG. 5 is a block diagram view of an embodiment of the disclosure.

With reference now to the drawings, and in particular to FIGS. 1 through 5 thereof, a new temperature monitor embodying the principles and concepts of an embodiment of the disclosure and generally designated by the reference numeral 10 will be described.

As best illustrated in FIGS. 1 through 5, the system for monitoring ambient temperatures 10 generally comprise a temperature monitoring device 20 that can be affixed to a child's car seat 12 and communicate with an electronic device 14 of a user. The temperature monitoring device 20 has a housing 30. A power source 32 and a microcontroller 34 are mounted within the housing 20. The microcontroller 34 includes a transmitter 36 that wirelessly communicates with an external server and a temperature sensor 38 that is the microcontroller. The transmitter 36 and the temperature sensor 38 each have an active state and a resting state. In the resting state, the transmitter 36 and temperature sensor 38 draw little to no power from the power source 32. The temperature sensor 38 is programmed to periodically enter the active state to take ambient temperature readings. When those ambient temperature readings fall outside of the predetermined ranges for child safety, the transmitter 36 enters the active state and sends an alert to the server, which relays the alert to a mobile device 14 of a user. If the user fails to respond to the alert, the transmitter 36 sends the alert to an emergency communications line 16. The transmitter may also send the alert to an additional caregiver device 18, such as a mobile device of another person or user who is responsible for the child. If the server is unresponsive, the transmitter 36 emits an audible alarm at a level that will alert passerby without risking damage to the child's hearing.

Embodiments of the temperature monitoring device 20 include a housing 30 having a base plate 22 surrounded by a peripheral wall 24. The peripheral wall 24 generally extends upwardly from the base plate 22. The base plate may be integrally formed with the peripheral wall 24 or may be otherwise attached using any appropriate means. A top plate 26 is opposite the peripheral wall 24 from the base plate 22. In the example provided in FIG. 3, the top plate 26 is affixed to the peripheral wall 24 using a plurality of screws 28, but any appropriate means may be used. The housing 30 has an interior space 31 that is bounded by the base plate 22, the peripheral wall 24, and the top plate 26. An adhesive 29 may be mounted to an exterior surface 23 of the base plate 22. The adhesive 29 may alternatively be mounted to another exterior surface of the housing 30. The adhesive 29 is configured to mount the housing 30 to an operating surface, such as a child's car seat 12. In some embodiments, the adhesive 29 may comprise a temporary or removable adhesive so that the placement of the housing 30 can be adjusted. In other embodiments, an adhesive 29 that more permanently affixes the housing 30 to the operating surface may be used.

A power source 32, such as a rechargeable battery, is mounted within the interior space 31. For example, the power source 32 may be affixed to the base plate 22. In embodiments including a rechargeable battery as the power source 32, a charging port 33 may be positioned in the housing 30. The charging port 33 should be exposed within an exterior surface 23 of the housing 30. For example, the charging port 33 may be configured to receive a USB charging cable. The charging port 33 is electrically coupled with the rechargeable battery 32.

A microcontroller 34 is mounted within the interior space 31, for example to the base plate 22. The microcontroller 34 is electronically coupled with the power source 32. The microcontroller 34 includes a transmitter 36 that is in wireless electronic communication with an external server (not shown). The transmitter 36 has an active transmission state and a resting transmission state. While in the resting transmission state, the transmitter 36 draws no power or reduced power from the power source 32.

The external server (not shown) is in wireless electronic communication with a mobile device 14 of a user. In embodiments, the mobile device 14 may have an application that provides a user interface between the mobile device 14 and the transmitter 36. With the user interface, the user may view a plurality of their registered temperature monitoring devices 20, adjust settings and controls for the device 20, respond to alerts issued by the device 20, and perform other such tasks. The server is also in wireless electronic communication with an emergency line 16, such as a 911 line or other emergency contact number. As explained further below, the transmitter 36 can send alerts to the mobile device 14 of the user or the emergency line 16. For example, if the user does not respond to an alert issued to the mobile device 14, the transmitter could send the alert to the emergency line 16 so that first responders or other personnel can respond to the dangerous temperature conditions surrounding the device 20. With this alert, either the user or the emergency personnel can respond and remove a child from the child's car seat 12 when surrounding temperatures pose a risk to the child's health and well-being. Additionally, the server may be in wireless electronic communication with an additional caregiver device 18, which is a mobile or electronic device of another person or user who may be responsible for the child or otherwise capable of responding to the alert. The transmitter 36 can send the alert to the additional caregiver device 18 if the user does not respond to the alert. For example, the transmitter 36 may send the alert to the additional caregiver device 18 before sending the alert to the emergency line 16 or simultaneously with sending the alert to the emergency line 16. With this alert, the additional caregiver can also respond and remove the child from the child's care seat 12 when surrounding temperatures risk harming the child. The user interface of the mobile application may permit the user to input information about the additional caregiver or connect the additional caregiver device 18 with the temperature monitoring device 20.

A temperature sensor 38 is also included in the microcontroller 34. The temperature sensor 38 is in electronic communication with the transmitter 36. The temperature sensor 38 has an active state and a resting state. The temperature sensor 38 draws no power or reduced power from the power source 32 when the temperature sensor 38 is in the resting state. The temperature sensor 38 periodically alternates to the active state, when the temperature sensor 38 measures the temperature surrounding the device 20. For example, the periodic alterations into the active state may occur at an interval ranging from 2 minutes to 8 minutes. In some embodiments, the user can adjust the interval using the application on their mobile device 14. The temperature sensor 38 is also configured to be in the resting state during a sleep time. Again, in some embodiments the user may adjust the sleep time using their mobile device 14. The temperature sensor 38 may also have a default setting for the sleep time, for example from 11:00 P.M. to 7:00 A.M. The sleep time may be determined based on lower environmental temperatures at night, when the sun is down and therefore not elevating the temperatures inside a vehicle, the sleep schedule and routine of the user, or other appropriate factors.

The transmitter 36 is configured to enter the active transmission state when the temperature sensor 38 measures an ambient temperature that is less than a minimum temperature or greater than a maximum temperature. The minimum and maximum temperatures should be determined by considering the safety of a child sitting inside a vehicle at those temperatures. For example, the minimum temperature may be no greater than 55° F. and the maximum temperature may be at least greater than 82° F. Because the device 20 measures ambient temperatures within the vehicle, the minimum and maximum temperatures will also be based on temperatures within the vehicle or other environment directly surrounding the child's car seat.

The transmitter 36 is configured to send a temperature alert to the server when the ambient temperature is less than the minimum temperature or greater than the maximum temperature. The server is configured to relay the temperature alert to the mobile device 14. For example, the alert may display on the mobile device 14 as a notification from the application installed on the mobile device 14. The transmitter 36 may be further configured to receive a response from the server that originates from the mobile device 14. For example, the user may input the response using the application to confirm the child has been removed from the vehicle.

If the user does not respond to the temperature alert, the transmitter 36 can send an emergency alert to the emergency line 16 or to an additional caregiver device 18. For example, the transmitter 36 may send the emergency alert when the response is not received within a threshold time limit. In embodiments, the threshold time limit ranges from 1 minute to 5 minutes after the transmitter 36 sends the temperature alert to the mobile device 14 via the server. The threshold time limit should be determined by considering how long a child can stay in extreme temperatures without risking illness or injury. Accordingly, a relatively short threshold time limit should be used, because temperatures within vehicles can rise to dangerously high levels in under 10 minutes. The emergency alert may include information used to identify the vehicle in which the child's car seat 12 is placed, such as a last-known location, make, or model of the vehicle. Other appropriate identifying information may also be included. In some embodiments, the user may input the identifying information into the application on the mobile device 14 so that emergency personnel or additional caregivers can more easily locate the child in an emergency.

If the server is offline or unresponsive to the temperature alert or the emergency alert, the transmitter may issue an audible alarm to notify nearby people that a child may need assistance. The alarm should be loud enough for passersby to hear the alarm from outside the vehicle, but not so loud that it would risk damaging the child's hearing. The child may be stuck in the vehicle listening to the alarm for some time, so the alarm may issue a noise ranging from 60 dB to 70 dB.

Because the transmitter 36 and temperature sensor 38 only draw power from the power source 32 when each is in their respective active states, the power requirements for the device 20 are relatively low. The power source 32 can therefore retain a power charge for a long time. In embodiments using a rechargeable battery, the battery would only need to be recharged weekly or monthly. With improved battery performance, the recharge interval could be extended even further. This improved battery performance means the device 20 can remain affixed to the child's car seat 12 at all times. The user does not need to constantly remember to recharge or reattach the device 20. A low module battery warning message may also be sent to the mobile device 14 when the power source 32 needs to be recharged. This will mean the device 20 is far more likely to be in a position to provide assistance when needed.

In use, the device 20 may be relatively small, making it easy to place onto any existing car seat 14. For example, the housing 30 may have measurements of 4 inches by 3 inches by 1.5 inches. Because the device 20 can fit onto any car seat, it can be used on new seats or old ones. The device 20 is small enough that it could be built into new car seats or attached to existing ones. The device is convenient and affordable enough to be used in nearly any situation involving a child's car seat.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A temperature monitoring device, comprising:
 a housing having an interior space being bounded by a base plate surrounded by a peripheral wall and a top plate attached to the peripheral wall opposite the base plate;
 a power source being mounted to the base plate within the interior space;
 a microcontroller being mounted within the interior space, the microcontroller being electronically coupled with the power source, including:
  a transmitter being in wireless electronic communication with a server, the transmitter having an active transmission state and a resting transmission state, wherein the transmitter draws no power or reduced power from the power source when the transmitter is in the resting transmission state;
  the server being configured to relay signals between the transmitter and at least one of an electronic device of a user and an emergency communications line;
  a temperature sensor being in electronic communication with the transmitter, the temperature sensor having an active state and a resting state, wherein no or reduced power is drawn from the power source when the temperature sensor is in the resting state, the temperature sensor periodically alternating to the active state, an interval of the periodic alterations of the temperature sensor is programmable by the user via the electronic device, the temperature sensor being configured to measure an ambient temperature when the temperature sensor is in the active state;
  the transmitter being configured to activate when the temperature sensor measures an ambient temperature that is less than a minimum temperature or greater than a maximum temperature;
  the transmitter being configured to send a temperature alert to the server when the ambient temperature is less than the minimum temperature or greater than the maximum temperature, the server being configured to relay the temperature alert to the electronic device;

the transmitter being configured to receive a response from the electronic device via the server; and the transmitter being configured to send an emergency alert to the emergency communications line when the response is not received within a threshold time limit.

2. The temperature monitoring device of claim 1, wherein the peripheral wall extends upwardly from the base plate.

3. The temperature monitoring device of claim 1, the housing further comprising:

an adhesive being mounted to an exterior surface of the base plate, the adhesive being configured to removably mount the housing to an operating surface.

4. The temperature monitoring device of claim 3, wherein the operating surface is a child's car seat.

5. The temperature monitoring device of claim 1, wherein the microcontroller is mounted to the base plate.

6. The temperature monitoring device of claim 1, wherein an interval of the periodic alterations of the temperature sensor has a range of between 2 minutes and 8 minutes.

7. The temperature monitoring device of claim 1, wherein the temperature sensor is configured to be in the resting state during a sleep time.

8. The temperature monitoring device of claim 7, wherein the sleep time is programmable by the user via the electronic device, the sleep time further comprising a default setting from 10:00 P.M. to 8:00 A.M.

9. The temperature monitoring device of claim 1, wherein the minimum temperature is no greater than 55° F. and wherein the maximum temperature is at least greater than 82° F.

10. The temperature monitoring device of claim 1, wherein the threshold time limit is at least 3 minutes after the transmitter sends the temperature alert.

11. The temperature monitoring device of claim 1, the emergency alert further comprising a location data of the microcontroller.

12. The temperature monitoring device of claim 1, wherein the server is configured to relay signals between the transmitter and an additional caregiver device, and wherein the transmitter is configured to send the emergency alert to the additional caregiver device when the response is not received within the threshold time limit.

13. The temperature monitoring device of claim 1, wherein the power source is a rechargeable battery.

14. The temperature monitoring device of claim 13, further comprising:

a charging port being positioned in the housing and being exposed within an exterior of the housing, the charging port being electrically coupled with the rechargeable battery, the charging port being configured to receive a USB charging cable.

15. The temperature monitoring device of claim 14, the rechargeable battery being configured to receive a charge from a magnetic charging assembly.

16. The temperature monitoring device of claim 1, wherein the transmitter is configured to issue an audible alarm when the server is not responding to the temperature alert, the audible alarm ranging from 60 decibels to 70 decibels.

17. A temperature monitoring device, comprising:

a housing having a base plate surrounded by a peripheral wall, the peripheral wall extending upwardly from the base plate, the base plate being integrally formed with the peripheral wall; a top plate being opposite the peripheral wall from the base plate, the housing having an interior space being bounded by the base plate, the peripheral wall, and the top plate, the housing including:

a plurality of screws affixing the top plate to the peripheral wall;

an adhesive being mounted to an exterior surface of the base plate, the adhesive being configured to removably mount the housing to an operating surface, the operating surface being on a car seat;

a rechargeable battery being mounted to the base plate within the interior space; and a charging port being positioned in the housing and being exposed within an exterior of the housing, the charging port being electrically coupled with the rechargeable battery, the charging port being configured to receive a USB charging cable;

a microcontroller being mounted to the base plate within the interior space, the microcontroller being electronically coupled with the rechargeable battery, the microcontroller including:

a transmitter being in wireless electronic communication with a server, the transmitter having an active transmission state and a resting transmission state, wherein the transmitter draws no power or reduced power from the rechargeable battery when the transmitter is in the resting transmission state;

the server being in wireless electronic communication with a mobile device of a user, the mobile device having an application being configured to provide a user interface between the mobile device and the transmitter, the server being in wireless electronic communication with an emergency line;

a temperature sensor being in electronic communication with the transmitter, the temperature sensor having an active state and a resting state, wherein the temperature sensor draws no power or reduced power from the rechargeable battery when the temperature sensor is in the resting state, the temperature sensor periodically alternating to the active state, the temperature sensor being configured to measure an ambient temperature when the temperature sensor is in the active state, the periodic alterations having an interval ranging from 3 minutes to 7 minutes, the temperature sensor being configured to be in the resting state during a sleep time, the sleep time being from 11:00 P.M. to 7:00 A.M.;

the transmitter being configured to enter the active transmission state when the temperature sensor measures an ambient temperature that is less than a minimum temperature or greater than a maximum temperature, the minimum temperature being no greater than 55° F., the maximum temperature being at least greater than 82° F.;

the transmitter being configured to send a temperature alert to the server when the ambient temperature is less than the minimum temperature or greater than the maximum temperature, the server being configured to relay the temperature alert to the mobile device;

the transmitter being configured to receive a response from the server, the response originating from the mobile device, the user inputting the response with the user interface;

the transmitter being configured to send an emergency alert to the emergency line when the response is not received within a threshold time limit, the threshold time limit ranging from 1 minute to 5 minutes after the transmitter sends the temperature alert;

the emergency alert including information about a location of the microcontroller;

the transmitter being configured to issue an audible alarm when the server is unresponsive to the temperature alert, the audible alarm ranging from 60 dB to 70 dB.

18. The temperature monitoring device of claim 17, wherein the server is in wireless electronic communication with an additional caregiver device, and wherein the transmitter is configured to send the emergency alert to the additional caregiver device when the response is not received within the threshold time limit.

19. A temperature monitoring system, comprising:

an electronic device of a user, the electronic device having an application configured to provide a user interface for the temperature monitoring system;

a child's car seat;

a temperature monitoring device being affixed to the child's car seat, the temperature monitoring device comprising:

a housing having an interior space being bounded by a base plate surrounded by a peripheral wall and a top plate attached to the peripheral wall opposite the base plate;

a power source being mounted to the base plate within the interior space;

a microcontroller being mounted within the interior space, the microcontroller being electronically coupled with the power source, including:

a transmitter being in wireless electronic communication with a server, the transmitter having an active transmission state and a resting transmission state, wherein the transmitter draws no power or reduced power from the power source when the transmitter is in the resting transmission state;

the server being configured to relay signals between the transmitter and at least one of an electronic device of a user and an emergency communications line;

a temperature sensor being in electronic communication with the transmitter, the temperature sensor having an active state and a resting state, wherein no or reduced power is drawn from the power source when the temperature sensor is in the resting state, the temperature sensor periodically alternating to the active state, the periodic alterations having an interval ranging from 3 minutes to 7 minutes wherein the interval of the periodic alterations is programmable by the user via the electronic device;

the transmitter being configured to activate when the temperature sensor measures an ambient temperature that is less than a minimum temperature or greater than a maximum temperature;

the transmitter being configured to send a temperature alert to the server when the ambient temperature is less than the minimum temperature or greater than the maximum temperature, the server being configured to relay the temperature alert to the electronic device;

the transmitter being configured to receive a response from the electronic device via the server; and the transmitter being configured to send an emergency alert to the emergency communications line when the response is not received within a threshold time limit.

* * * * *